United States Patent
Su et al.

(10) Patent No.: US 6,525,129 B1
(45) Date of Patent: Feb. 25, 2003

(54) WATER-SOLUBLE PRESSURE-SENSITIVE ADHESIVES

(75) Inventors: Shiaonung J. Su, Cerritos, CA (US); James P. Akeley, Mill Hall, PA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/469,149

(22) Filed: Dec. 20, 1999

(51) Int. Cl.⁷ ............................................. C08L 39/04
(52) U.S. Cl. .................. 524/555; 524/560; 524/561; 524/556; 524/563; 524/564; 524/394
(58) Field of Search ................. 524/808, 809, 524/845, 850, 853; 523/335; 526/264, 307, 320, 329.5, 329.6, 330

(56) References Cited

U.S. PATENT DOCUMENTS

| | | | |
|---|---|---|---|
| 4,699,146 A | 10/1987 | Sieverding | 128/640 |
| 4,726,982 A | 2/1988 | Traynor et al. | 428/213 |
| 4,737,410 A | 4/1988 | Kantner | 428/343 |
| 4,750,482 A | 6/1988 | Sieverding | 128/156 |
| 4,988,742 A * | 1/1991 | Moon et al. | 522/79 |
| 5,084,348 A | 1/1992 | Czech et al. | 428/355 |
| 5,183,841 A | 2/1993 | Bernard | 524/272 |
| 5,225,473 A | 7/1993 | Duan | 524/388 |
| 5,330,832 A | 7/1994 | Liu | 428/355 |
| 5,362,816 A | 11/1994 | Snyder et al. | 525/329.9 |
| 5,385,965 A | 1/1995 | Bernard et al. | 524/272 |
| 5,395,907 A * | 3/1995 | Zajaczkowski et al. | 526/320 |
| 5,433,892 A | 7/1995 | Czech | 252/500 |
| 5,468,800 A * | 11/1995 | Fölsch et al. | 524/458 |
| 5,508,367 A | 4/1996 | Zajaczkowski | 526/320 |
| 5,741,543 A * | 4/1998 | Winslow et al. | 427/208.4 |
| 5,760,153 A | 6/1998 | Epple et al. | 526/318 |
| 5,947,917 A * | 9/1999 | Carte et al. | 602/52 |
| 5,951,999 A | 9/1999 | Therriault et al. | 424/448 |
| 6,013,722 A * | 1/2000 | Yang et al. | 524/558 |
| 6,107,391 A * | 8/2000 | Verge et al. | 524/501 |
| 6,124,417 A * | 9/2000 | Su et al. | 526/318.44 |

FOREIGN PATENT DOCUMENTS

| | | |
|---|---|---|
| EP | 147 067 | 7/1985 |
| WO | 94/24177 | 10/1994 |

* cited by examiner

*Primary Examiner*—David W. Wu
*Assistant Examiner*—Rip A Lee
(74) *Attorney, Agent, or Firm*—Christie, Parker & Hale, LLP

(57) ABSTRACT

A dissolvable pressure-sensitive adhesive is provided. The adhesive comprises an emulsion acrylic copolymer formed from a plurality of monomers comprising an alkyl (meth) acrylate, an N-vinyl lactam monomer, and at least one hydroxy (meth)acrylate ester, and preferably at least one modifying monomer. The copolymer is preferably blended with one or more post-additive to enhance its dissolvability. Preferably the copolymer has a weight average molecular weight less than about 120,000.

45 Claims, No Drawings

WATER-SOLUBLE PRESSURE-SENSITIVE ADHESIVES

FIELD OF THE INVENTION

The invention is directed to water-soluble pressure-sensitive adhesives and dissolvable pressure-sensitive adhesive labels.

BACKGROUND OF THE INVENTION

Containers used in the restaurant industry typically have a label attached to indicate the content, expiration date and other necessary information. Such containers are reuseable after being cleaned. However, for reuse of the container, it is desirable that the label, including the adhesive used to attach the label to the container, be cleanly removed. Adhesive residue left on the container after washing can lead to bacteria growth. Normally such containers are passed through an industrial dishwasher, which washes at approximately 60° C. for about 30 seconds. With commercially available labels, this process frequently leaves behind adhesive residue or results in a ghosting effect, i.e., an image of the label that is stained onto the container, most likely due to migration of the adhesive into the container and the cohesive failure effect of the adhesive. The ghosting effect occurs most frequently on plastic containers. A need exists for an adhesive that can be used for such applications so that, under such washing conditions, there is no adhesive residue or ghosting effect. Additionally, the adhesive and facestock need to dissolve or break up into very small particles so that they can be eliminated with the water and not clog the dishwasher.

SUMMARY OF THE INVENTION

The present invention provides dissolvable adhesives and dissolvable adhesive label constructions that address the above concerns. The dissolvable pressure-sensitive adhesive (PSA) comprises an emulsion acrylic copolymer. The emulsion acrylic copolymer is formed from a plurality of monomers comprising at least one alkyl (meth)acrylate, at least one N-vinyl lactam monomer, and at least one hydroxy (meth)acrylate ester. In a preferred embodiment, the plurality of monomers further comprises at least one modifying monomer. In another preferred embodiment, the copolymer is blended with a post-additive to enhance the dissolvability of the PSA. Preferably the copolymer has a weight average molecular weight less than about 120,000.

In a particularly preferred embodiment, the plurality of monomers comprises at least one N-vinyl lactam monomer present in an amount ranging from about 1% to about 15% by weight, at least one hydroxy (meth)acrylate ester present in an amount ranging from about 1% to about 15% by weight, at least one alkyl (meth)acrylate present in an amount ranging from about 35% to about 80% by weight, based on the total weight of the monomers; and at least one ethylenically unsaturated carboxylic acid monomer present in an amount ranging from about 4% to about 15% by weight, based on the total weight of the monomers.

In an even more particularly preferred embodiment, the plurality of monomers comprises at least one N-vinyl lactam monomer present in an amount ranging from about 4% to about 12% by weight, at least one hydroxy (meth)acrylate ester present in an amount ranging from about 1% to about 9% by weight, at least one alkyl (meth)acrylate present in an amount ranging from about 50% to about 70% by weight, at least one ethylenically unsaturated carboxylic acid monomer present in an amount ranging from about 6% to about 12% by weight, at least one modifying monomer present in an amount ranging from about 0.05% to about 3% by weight, and at least one vinyl ester present in an amount ranging from about 11% to about 15% by weight, based on the total weight of the monomers.

In another preferred embodiment, the adhesive, when coated on a dissolvable acetate facestock and subjected to a dissolvability test (as described herein), dissolves in less than 40 seconds.

DETAILED DESCRIPTION

The present invention is directed to dissolvable pressure-sensitive adhesives (PSAs) and dissolvable PSA constructions utilizing the dissolvable PSAs. The PSA comprises an emulsion acrylic copolymer formed from a plurality of monomers comprising at least one alkyl (meth)acrylate, at least one N-vinyl lactam monomer and at least one hydroxy (meth)acrylate ester.

Examples of suitable N-vinyl lactam monomers for use in the present invention include N-vinyl-2-pyrrolidone, 5-methyl-N-vinyl-2-pyrrolidone, 5-ethyl-N-vinyl-2-pyrrolidone, 3,3-dimethyl-N-vinyl-2-pyrrolidone, 3-methyl-N-vinyl-2-pyrrolidone, 3-ethyl-N-vinyl-2-pyrrolidone, 4-methyl-N-vinyl-2-pyrrolidone, 4-ethyl-N-vinyl-2-pyrrolidone, 1-vinyl-2-piperidone, N-vinyl-2-valerolactam, N-vinyl-2-caprolactam, and mixtures thereof. The N-vinyl lactam monomer (or mixture of N-vinyl lactam monomers) is preferably present in the monomer mixture in a total amount ranging from about 1% to about 15% by weight, more preferably from about 4% to about 12% by weight, even more preferably from about 6% to about 9% by weight, based on the total weight of the monomer mixture.

Examples of suitable hydroxy (meth)acrylate esters for use in the present invention include hydroxymethyl acrylate, 4-hydroxybutyl acrylate, hydroxyethyl acrylate, hydroxypropyl acrylate, hydroxybutyl acrylate, hydroxymethyl methacrylate, hydroxyethyl methacrylate, hydroxypropyl methacrylate, and hydroxybutyl methacrylate. The hydroxy (meth)acrylate ester (or mixture of hydroxy (meth)acrylate esters) is preferably present in the monomer mixture in a total amount ranging from about 1% to about 15% by weight, more preferably from about 1% to about 9% by weight, still more preferably from about 3% to about 9% by weight, based on the total weight of the monomer mixture.

In a particularly preferred embodiment, the monomer mixture further includes a modifying monomer to increase the shear of the adhesive. The modifying monomer is selected from nitrogen-containing heterocyclic methacrylates and internal crosslinkers. An example of a suitable nitrogen-containing heterocyclic methacrylate for use in the present invention is 1-2-methacryloxyethyl)imidazolidin-2-one (commercially available in a 50/50 mix with methyl acrylate under the name Norsocryl® 104, from Elf Atochem North America, Inc., Philadelphia, Pa.). Examples of suitable internal crosslinkers include multifunctional acrylates and methacrylates, such as diacrylates (ethylene glycol diacrylate, propylene glycol diacrylate, polyethylene glycol diacrylate, and hexanediol diacrylate), dimethacrylates (ethylene glycol diacrylate, diethylene glycol dimethacrylate, and 1,3 butane glycol dimethacrylate), triacrylates (trimethylolpropane trimethacrylate, ethoxylated trimethylolpropane triacrylate, and pentaerythritol triacrylate), and trimethacrylates (pentaerythritol trimethacrylate and trimethylolpropane trimethacrylate), as well as divinyl esters, such as divinylbenzene, divinyl succinate, divinyl adipate, divinyl maleate, divinyl oxalate, divinyl malonate, and divinyl glutarate. The modifying monomer (or mixture of modifying monomers) is preferably present in the monomer mixture in a total amount ranging from about 0.02% to about 4% by weight, more preferably from about 0.05% to about 3% by weight, based on the total weight of the monomers. If Norsocryl® 104 is used, it is preferably present in an amount ranging from about 0.1% to about 0.5% by weight, based on the total weight of the monomers.

The monomer mixture further comprises other suitable monomers typically used in the preparation of PSAs, such as alkyl (meth)acrylates, carboxylic acid monomers, vinyl esters and styrenic monomers. Examples of suitable alkyl (meth)acrylates for use in the present invention include methyl acrylate, ethyl acrylate, butyl acrylate, 2-ethylhexyl acrylate, isooctyl acrylate, isobornyl acrylate, isononyl acrylate, isodecyl acrylate, methylbutyl acrylate, 4-methyl-2-pentyl acrylate, butyl methacrylate, 2-ethylhexyl methacrylate, isooctyl methacrylate and mixtures thereof. The one or more alkyl (meth)acrylates are preferably present in the monomer mixture in a total amount ranging from about 35% to about 80% by weight, more preferably from about 50% to about 70% by weight, based on the total weight of the monomers.

Examples of suitable ethylenically unsaturated carboxylic acids for use in the present invention include acrylic acid, methacrylic acid, itaconic acid, fumaric acid and mixtures thereof. The one or more ethylenically unsaturated carboxylic acids are preferably present in the monomer mixture in a total amount ranging from about 4% to about 15% by weight, more preferably from about 6% to about 12% by weight, based on the total weight of the monomers.

Examples of suitable vinyl esters useful in the present invention include vinyl acetate, vinyl butyrate, vinyl propionate, vinyl isobutyrate, vinyl valerate, vinyl versatate and mixtures thereof. The one or more vinyl esters are preferably present in the monomer mixture in a total amount ranging from about 8% to about 18% by weight, more preferably from about 11% to about 15% by weight, based on the total weight of the monomers.

Examples of suitable styrenic monomers include styrene and alpha methyl styrene.

The dissolvable emulsion acrylic copolymers of the present invention can be prepared by any suitable technique, preferably by free-radical polymerization in the presence of suitable polymerization initiators and emulsifiers (surfactants). The polymerization is preferably conducted in an oxygen-free atmosphere. One or more activators, redox agents and chain transfer agents are also preferably employed.

Enough polymerization initiator is used to promote free-radical polymerization of the monomers. Preferably the polymerization initiators are water-soluble initiators. Nonlimiting examples of suitable water-soluble polymerization initiators include persulfates, such as sodium and potassium persulfate; peroxides, such as hydrogen peroxide and tert-butyl hydroperoxide; and azo compounds, such as VAZO initiators, used alone in combination with one or more reducing agents or activators, for example, bisulfites, metabisulfites, ascorbic acid, erythorbic acid, sodium formaldehyde sulfoxylate, ferrous sulfate, ferrous ammonium sulfate, and ferric ethylenediamine tetraacetic acid.

Non-ionic, anionic, and/or cationic surfactants are advantageously used in the emulsion polymerization of acrylic monomers, with a plurality of surfactants being preferred. Enough surfactant is included to form a stable emulsion without causing phase separation. Nonlimiting examples of surfactants useful in the practice of the present invention include Alipal CO-436, a sodium nonylphenol ethoxylate sulfate surfactant (available from Rhone-Poulenc, Cranbury, N.J.), AR-150, a nonionic, ethoxylated rosin acid emulsifier (available from Hercules, Inc., Wilmington, Del.), Trem LF-40, a sodium alkyl allyl sulfosuccinate surfactant (available from Henkel of America, Inc., King of Prussia, Pennsylvania), sodium pyrophosphate (available from J. T. Baker, Mallickrodt Baker, Inc., Phillibsburg, N.J.), Disponsil FES77, a sodium lauryl ether surfactant (available from Henkel of America, Inc.), Aerosol OT-75, a sodium dioctyl sulfosuccinate surfactant (available from American Cyanamid, Wayne, N.J.), Polystep B-22, a sodium nonylphenol ethyoxylated sulfate (available from Stepan Company, Inc., Winnetka, Ill.), and J927, a mixture of sodium nonylphenol ethoxylate sulfate and nonylphenol ethoxylate (available from Stepan Company). Preferably a sodium nonylphenol ethoxylate sulfate surfactant is included to increase the dissolvability of the resulting PSA copolymer. The sodium nonylphenol ethoxylate sulfate surfactant is preferably provided in the monomer mixture in a total amount ranging from about 4% to about 12% by weight, more preferably from about 6% to about 10% by weight, based on the total weight of the plurality of monomers in the monomer mixture.

It is also preferred to employ a small amount (e.g., from about 0.01 to 0.5% by weight based on the total weight of the monomers) of a chain transfer agent or other molecular weight regulator to control average polymer chain length of the acrylic copolymers. Nonlimiting examples include n-dodecyl mercaptan (n-DDM), t-dodecyl mercaptan (t-DDM), monothioglycerol, mercapto acetates, and long chain alcohols.

The emulsion copolymers of the invention are prepared with excellent conversions at a reaction temperature of around 70° C., in the presence of a persulfate or equivalent catalyst in an amount of from about 0.5% to about 1% by weight based on the total weight of the monomers. The monomer mixture is preferably fed over a period of about 3 hours. The reaction pH can be adjusted to within a range of from about 4.0 to about 6.0 by addition of sodium bicarbonate or a similar agent.

While actual production techniques may vary depending upon the particular monomer composition employed, available equipment and other considerations, in general the emulsion polymers are prepared by first mixing one or more pre-emulsions containing conventional surfactants, sodium bicarbonate, and some or all of the monomers in deionized water, adding reactive surfactants and other reactor ingredients to a reactor under nitrogen, heating the reactor to a temperature of about 68 to 72° C., and then adding an initiator charge containing, for example, potassium persulfate. The one or more pre-emulsions are added to the reactor, along with any accelerators, such as sodium formaldehyde sulfoxylate (hydroxymethane sulfinic acid, sodium salt). Any post-reaction charges are added, the reactor is cooled to below about 35° C., and the emulsion polymer is filtered. Before filtering the reaction mixture, preferably a biocide is added to prevent bacterial growth. An example of a suitable biocide is Kathon LX (available as a 1.5% solution from Rohm & Haas, Philadelphia, Pa.).

Alternatively, sequential polymerization can be used, wherein the monomers are allowed to react in distinct stages. Specifically, separate first and second pre-emulsions of monomers, surfactants, initiators and other components are prepared, a reactor is charged with an initial surfactant solution and catalyst solution, the first pre-emulsion of monomers is gradually fed into the reactor, and polymerization is initiated and allowed to propagate. After polymerization of the first pre-emulsion, the second pre-emulsion is gradually fed into the reactor, and polymerization continues. The result is a copolymer system of emulsified copolymer particles quite distinct from emulsion copolymers prepared by batch polymerization, as described above. Although not bound by theory, it is believed that sequential polymerization of the two monomeric pre-emulsions results in an emulsion of domain-type copolymeric particles, each having an inner core of a first copolymeric composition and an outer shell or region of a second copolymeric composition, partially or totally encapsulating the core.

Polymer molecular weight is an important property of the PSA and should be controlled for optimum performance. Preferred adhesive copolymers according to the present invention have relatively low weight-average molecular weights (Mw), preferably less than about 120,000, more preferably from about 40,000 to about 100,000, even more preferably from about 55,000 to about 90,000. It is preferred that the molecular weight of the polymer be generally less than 120,000 because larger polymers tend to cause grit, decreasing the dissolvability of the polymer. The low molecular weight polymers of the present invention can be obtained using n-dodecyl mercaptan or another suitable chain transfer agent.

In a particularly preferred embodiment of the invention, the resulting PSA copolymer is compounded or blended with one or more post-additives that improve the dissolvability and/or ghosting characteristics of the PSA. Suitable post-additives for use in connection with the invention include surfactants, plasticizers and mineral salts.

It has been found that the addition of one or more surfactants tends to improve the dissolvability of the PSA. Examples of suitable surfactants for use in the present invention include Disponil A-1080 (a nonionic ethoxylate mixture, commercially available from Henkel), Stepan 1861-68 (an ammonium salt of 3 mole phosphate ester, commercially available from Stepan Company), and AR-150 (a nonionic ethoxylated wood rosin surfactant, commercially available from Hercules). The post-additive surfactant (or mixture of surfactants) is preferably added to the copolymer in a total amount ranging from about 0.4% to about 10.0% by weight, more preferably from about 2% to about 6% by weight, based on the total weight of the copolymer.

It has been found that the addition of one or more plasticizers improves both the dissolvability and the ghosting characteristics of the PSA. Water-soluble polymeric plasticizers are preferred to prevent migration or passage of low molecular weight species out of the dried adhesive film and into the label facestock or to the adhesive/substrate interface causing adhesive deadening. Examples of suitable plasticizers for use in connection with the invention include polymeric plasticizers, such as Plasthall 7050 (a monomeric dialkylether diester plasticizer, commercially available from CP Hall, Memphis, Tenn.) and Plasthall P-900 (a polymeric phthalate plasticizer, commercially available from CP Hall). The one or more plasticizers are preferably added to the copolymer in a total amount ranging from about 0.1 to about 3.0% by weight, more preferably from about 0.5% to about 1.5% by weight, based on the total weight of the copolymer.

The addition of one or more mineral salts also improves the dissolvability of the PSA. Suitable mineral salts for use in connection with the invention include potassium acetate, calcium acetate, magnesium acetate, and ammonium acetate. The one or more mineral salts are preferably added to the copolymer in a total amount ranging from about 0.5% to about 15.0% by weight, based on the weight of the copolymer.

After polymerization and the addition of any post-additives, the PSAs of the invention can be used to prepare a label or other adhesive laminate construction using fabrication techniques well known in the art. For example, the PSA can be coated on a release liner (such as a siliconized paper or film), air- or oven-dried, and then laminated to a suitable facestock. Alternatively, the PSA can be coated directly on a facestock, dried, and then protected with a release liner. The PSA is applied at a desirable coat weight (conveniently measured on a dried basis), which generally lies within the range of about 10 to about 50 grams per square meter ($g/m^2$ or "gsm"), more preferably within the range of about 15 to about 25 gsm.

Preferred facestocks for use in connection with the invention are dissolvable facestocks, preferably made of paper. As used herein, the term "dissolvable facestock" refers to a facestock that disintegrates or disperses upon contact with water. An example of such as facestock is DISSOLVO dissolving paper, which is a Japanese wood-free paper (manufactured by Mishima Paper Co., Tokyo, Japan).

Preferably the adhesive, when coated on a dissolvable acetate facestock and subjected to a dissolvability test, dissolves in less than about 40 seconds, more preferably less than about 33 seconds, still more preferably less than about 30 seconds. As used herein, the term "dissolvability test" refers to the following test. An adhesive label (1"×1"), is prepared with an adhesive coated on a dissolvable acetate facestock (commercially available from Mitsui) and applied on an insoluble test panel made of LEXAN. The label is dwelled on the test panel for a time period of about fifteen minutes at 25° C. After dwelling for the indicated time, the test panel is immersed in a water bath at 60° C. and moved back and forth slowly. The time for complete dissolution of the test sample is observed and noted.

EXAMPLES

In the examples and tables that follow, the following abbreviations are used:

Surfactants

| | |
|---|---|
| AR-150 | nonionic, ethoxylated rosin acid emulsifier |
| CO-436 | Alipal CO-436, sodium nonylphenol ethyoxylated sulfate surfactant |
| TSPP | sodium pyrophosphate |
| FES77 | sodium lauryl ether surfactant |
| OT-75 | sodium dioctyl sulfosuccinate surfactant |
| B-22 | sodium nonylphenol ethyoxylated sulfate surfactant |
| J927 | blend of sodium nonylphenol ethoxylate sulfate & nonylphenol ethoxylate |

Catalysts, Initiators, and Other

| | |
|---|---|
| SFS | sodium formaldehyde sulfoxylate (hydroxymethane sulfinic acid, sodium salt) |
| Fe-EDTA | ethylenediaminetetraacetic acid, iron (III) sodium salt |
| nDDM | n-dodecyl mercaptan |

Substrates

| | |
|---|---|
| S.S. | stainless steel |
| HDPE | high density polyethylene |
| R.C. | recycled corrugated board |

Adhesive Failure Modes

| | |
|---|---|
| Pt | paper tear |
| P | panel failure |
| Fp | fiber pick |
| Lfp | light fiber pick |
| coh | cohesive failure |
| Z | Zippy |

Two emulsion polymer PSA compositions according to the invention were prepared, along with eleven comparative emulsion polymer PSA compositions. The compositions of Examples 1 and 2 and Comparative Examples 1 to 4 were prepared by first mixing a preemulsion containing surfactants, sodium bicarbonate, and the monomers in deionized water, adding a reactor charge to a reactor under nitrogen, heating the reactor to a temperature of about 68 to 72° C., and then adding to the reactor an initiator charge. The preemulsion was added to the reactor along with an accelerator feed and a catalyst feed. After polymerization, the reactor contents were cooled to below about 35° C., and the resulting emulsion polymer was filtered. The compositions of the reactor charge, initiator charge, preemulsion, accelerator feed and catalyst feed are set forth in Tables 1 and 2 below, where amounts are indicated in grams.

The compositions of Comparative Examples 5 to 10 were prepared by sequential polymerization. Specifically, separate first and second pre-emulsions of monomers, surfactants, initiators and other components were prepared, and the reactor was charged with an initial reactor charge and an initiator charge. After about five minutes, the first pre-emulsion of monomers was gradually fed into the reactor, along with the accelerator feed and catalyst feed, and polymerization was initiated and allowed to propagate. After polymerization of the first pre-emulsion, the second pre-emulsion was gradually fed into the reactor and polymerization continued. The compositions of the reactor charge, initiator charge, first and second pre-emulsions, accelerator feed and catalyst feed are set forth in Tables 3 and 4 below, where amounts are indicated in grams and F1 and F2 indicate the first pre-emulsion and the second pre-emulsion, respectively.

TABLE 1

| | Example 1 | Example 2 | Comp. Example 1 |
|---|---|---|---|
| Reactor Charge | | | |
| Water | 100 | 335 | 210 |
| Fe-EDTA | 0.1 | 0.1 | 0.1 |
| CO-436 | 10 | 5 | |
| FES77 | | | 5 |
| Initiator Charge | | | |
| Potassium persulfate | 2.3 | 2.3 | 1.75 |
| Sodium bicarbonate | 9 | 8 | 7.0 |
| Water | 15 | 15 | 3 |

TABLE 1-continued

| | Example 1 | Example 2 | Comp. Example 1 |
|---|---|---|---|
| Preemulsion | | | |
| Water | 275 | 100 | 180 |
| CO-436 | 40 | 40 | |
| $NaHCO_3$ | 4 | 2 | 3 |
| FES77 | | | 55 |
| OT75 | | | 6 |
| TSPP | | | 2 |
| 2-Ethylhexylacrylate | 280 | 270 | 219 |
| Butyl acrylate | 10 | 10 | 93 |
| Vinyl acetate | 70 | 70 | 70 |
| Methyl acrylate | 50 | 50 | 50 |
| Methacrylic acid | 10 | 10 | 10 |
| Acrylic acid | 40 | 30 | 50 |
| Vinylpyrrolidone | 40 | 40 | 40 |
| 2-Hydroxyethyl acrylate | 20 | 40 | 20 |
| Norsocryl-104 | 1 | 2 | |
| NDDM | 2.7 | 2.6 | 2.7 |
| T-Butyl hydroperoxide | 1.8 | 1.8 | 1.8 |
| Accelerator Feed | | | |
| Water | 50 | 50 | 45 |
| SFS | 0.75 | 0.75 | 0.75 |
| Catalyst Feed | | | |
| Water | 50 | 50 | 45 |
| Potassium persulfate | 1 | 1 | 1.55 |

TABLE 2

| | Comp. Example 2 | Comp. Example 3 | Comp. Example 4 |
|---|---|---|---|
| Reactor Charge | | | |
| Water | 230 | 150 | 100 |
| Fe-EDTA | 0.1 | 0.1 | 0.1 |
| CO-436 | | 10 | 10 |
| FES77 | 10 | | |
| Initiator Charge | | | |
| Potassium persulfate | 2.25 | 2.3 | 2.3 |
| Sodium bicarbonate | 9 | 9 | 9 |
| Water | 15 | 15 | 15 |
| Preemulsion | | | |
| Water | 180 | 180 | 275 |
| CO-436 | | 40 | 40 |
| $NaHCO_3$ | 4 | 4 | 4 |
| FES77 | 55 | | |
| OT75 | 6 | | |
| TSPP | 2 | | |
| 2-Ethylhexylacrylate | 279 | 300 | 300 |
| Butyl acrylate | 102 | | 10 |
| Vinyl acetate | 70 | 70 | 70 |
| Methyl acrylate | 50 | 50 | 50 |
| Methacrylic acid | 16 | 10 | 10 |
| Acrylic acid | 80 | 40 | 40 |
| Vinylpyrrolidone | | 40 | 40 |
| Norsocryl-104 | | | |
| NDDM | 2 | 2.8 | 2.8 |
| T-Butyl hydroperoxide | 1.8 | 1.8 | 1.8 |
| Accelerator Feed | | | |
| Water | 45 | 50 | 50 |
| SFS | 0.75 | 0.75 | 0.75 |
| Catalyst Feed | | | |
| Water | 45 | 50 | 50 |
| Potassium persulfate | 0.86 | 1 | 1 |

TABLE 3

|  | Comp. Ex. 5 | | Comp. Ex. 6 | | Comp. Ex. 7 | | Comp. Ex. 8 | |
|---|---|---|---|---|---|---|---|---|
| Reactor Charge | | | | | | | | |
| Water | 150 | | 150 | | 140 | | 150 | |
| Fe-EDTA | 0.1 | | 0.1 | | 0.1 | | 0.1 | |
| CO-436 | 10 | | 10 | | | | 10 | |
| AR150 | | | | | 30 | | 5 | |
| Sodium vinyl sulfonate | | | | | 10 | | | |
| Hydrogen peroxide | | | | | 7.5 | | | |
| Initiator Charge | | | | | | | | |
| Potassium persulfate | 2.3 | | 2.3 | | 2.25 | | 2.3 | |
| Sodium bicarbonate | 9 | | 9 | | 9 | | 9 | |
| Water | 15 | | 15 | | 20 | | 15 | |
| Preemulsion | F1 | F2 | F1 | F2 | F1 | F2 | F1 | F2 |
| Water | 112.5 | 112.5 | 112.5 | 112.5 | 90 | 61.8 | 112.5 | 112.5 |
| CO-436 | 23.5 | 23.5 | 23.5 | 23.5 | | | 20 | 20 |
| NaHCO₃ | 2 | 2 | 2 | 2 | 1.87 | 1.87 | 2 | 2 |
| J927 | | | | | 30 | 28 | | |
| 2-Ethylhexyl-acrylate | 168.7 | 168.7 | 168.7 | 168.7 | 50 | 168 | 150 | 150 |
| Butyl acrylate | | | | | 95.6 | | | |
| Vinyl acetate | 70 | | 70 | | 70 | | 70 | |
| Methyl acrylate | 25 | 25 | 25 | 25 | 25 | 25 | 25 | 25 |
| Methacrylic acid | 6 | 6 | 5 | 5 | 6 | 33.4 | 5 | 5 |
| Acrylic acid | 25 | 25 | 25.85 | 25.85 | 23 | 6.69 | 20 | 20 |
| Vinylpyrrolidone | | | | | | | 20 | 20 |
| NDDM | 1.5 | 1.5 | 1.5 | 1.5 | 0.25 | 1.25 | 1.5 | 1.5 |
| T-Butyl hydroperoxide | 0.9 | 0.9 | 0.9 | 0.9 | 0.9 | 0.9 | 0.9 | 0.9 |
| Accelerator Feed | | | | | | | | |
| Water | 50 | | 50 | | 45 | | 50 | |
| SFS | 0.75 | | 0.75 | | 0.75 | | 0.75 | |
| Catalyst Feed | | | | | | | | |
| Water | 50 | | 50 | | 45 | | 50 | |
| Potassium persulfate | 1 | | 1 | | 0.74 | | 1 | |

TABLE 4

|  | Comp. Ex. 9 | | Comp. Ex. 10 | | Comp. Ex. 11 | |
|---|---|---|---|---|---|---|
| Reactor Charge | | | | | | |
| Water | 150 | | 150 | | 110 | |
| Fe(+3), EDTA, Sodium Salt | 0.1 | | 0.1 | | 0.1 | |
| CO-436 | 10 | | 5 | | | |
| AR150 | 5 | | | | | |
| B-22 | | | | | 10 | |
| Initiator Charge | | | | | | |
| Potassium persulfate | 2.3 | | 2.3 | | 2.3 | |
| Sodium bicarbonate | 9 | | 9 | | 9 | |
| Water | 15 | | 15 | | 15 | |
| Preemulsion | F1 | F2 | F1 | F2 | F1 | F2 |
| Water | 112.5 | 92.5 | 112.5 | 112.5 | 112.5 | 112.5 |
| CO-436 | 20 | 20 | 20 | 20 | | |
| NaHCO₃ | 2 | 2 | 2 | 2 | 2 | 2 |
| AR150 | | | 3.5 | 3.5 | | |
| 2-Ethylhexylacrylate | 150 | 150 | 168.7 | 168.7 | 150 | 150 |
| Butyl acrylate | | | | | 5 | 5 |
| Vinyl acetate | 70 | | 70 | | 70 | |
| Methyl acrylate | 25 | 25 | 25 | 25 | 25 | 25 |
| Methacrylic acid | 5 | 5 | 12 | 12 | 5 | 5 |
| Acrylic acid | 20 | 20 | 20 | 20 | 20 | 20 |
| Vinylpyrrolidone | 20 | 20 | | | 20 | 20 |
| Norsocryl-104 | | | 1 | 1 | 0.5 | 0.5 |
| NDDM | 1.5 | 1.5 | 1.5 | 1.5 | 1.4 | 1.4 |
| T-Butyl hydroperoxide | 0.9 | 0.9 | 0.9 | 0.9 | 0.9 | 0.9 |
| Accelerator Feed | | | | | | |
| Water | 50 | | 50 | | 50 | |
| SFS | 0.75 | | 0.75 | | 0.75 | |
| Catalyst Feed | | | | | | |
| Water | 50 | | 50 | | 50 | |
| Potassium persulfate | 1 | | 1 | | 1 | |

Dissolvability and Ghosting Test

An adhesive label (1"×1"), prepared with an adhesive as described above coated on a dissolvable acetate facestock (commercially available from Mitsui), was applied on an insoluble test panel made of LEXAN. The label was dwelled on the test panel for a time period of about fifteen minutes at 25° C. After dwelling for the indicated time, the test panel was immersed in a water bath at 60° C. and moved back and forth slowly for 30 to 60 seconds. The time for complete dissolution of the test sample was observed and noted. The panel was then removed from the water bath and dried in a forced air over at 70° C. for five minutes. The dried panel was removed from the oven and observed for ghosting on the substrate. A ghost rating was assigned to each sample. The ghost rating was on a scale of 1 to 5 where score of 1 indicated no visual evidence of residue or staining on the substrate, 2 indicated only very slight visual evidence of residue or staining on the substrate, usually only observed as a light outline where the label was applied, 3 indicated slight visual evidence of staining, typically a discoloration across the entire area where the label was applied, 4 indicated moderate staining, evident across the entire area where the label was applied, and 5 indicated severe staining, including incomplete label solubility. The dissolve times and ghost ratings are shown in Table 5 below.

Molecular Weight

Polymer samples were analyzed by gel permeation chromatography (GPC) for molecular weight information. About 200 mg of wet adhesive were dispersed in 10 mL of solvent, tumbled for 2 to 4 hours, and filtered through a 0.45 micron PTFE syringe filter. The, injection size was 50 µL. Calibration was against a set of twelve polystyrene standards obtained from Polymer Labs, ranging from 580 to 1,290,000 Da. Millenium version 3.0 software from Waters was used with the GPC option. Calibration was done daily, and a check sample of SRM 706 polystyrene from the National Institute for Standards and Technology (Gaithersburg, Md.) was also analyzed daily with each batch of samples. A Waters (Milford, Mass.) 2690 pumping system was used with a Waters 410 refractive index detector. The columns were three Plgel Mixed-C 300 mm×7.5 mm with a 50 mm×7.5 mm guard column from Polymer Labs (Amherst, Mass.). The mobile phase was THF at 1.0 mL/min.

TABLE 5

| Example | Dissolve Time | Ghost Rating | Mw |
|---|---|---|---|
| Example 1 | 31 ± 2.5 sec. | 2–3 | 63,600 |

TABLE 5-continued

| Example | Dissolve Time | Ghost Rating | Mw |
|---|---|---|---|
| Example 2 | 27 ± 2.5 sec. | 3 | 86,100 |
| Comparative Example 1 | 120 ± 2.5 sec. (partial dissolve) | 5 | N/A |
| Comparative Example 2 | >45 sec. | 4 | N/A |
| Comparative Example 3 | >45 sec. | 4 | N/A |
| Comparative Example 4 | 79 ± 2.5 sec. | 4–5 | N/A |
| Comparative Example 5 | 45 ± 2.5 sec. | 4 | N/A |
| Comparative Example 6 | 28 ± 2.5 sec. | 3–4 | N/A |
| Comparative Example 7 | >45 sec. | 4 | N/A |
| Comparative Example 8 | 70 ± 2.5 sec. | 4–5 | 57,200 |
| Comparative Example 9 | >45 sec. | 4 | N/A |
| Comparative Example 10 | >45 sec. | 4 | N/A |
| Comparative Example 11 | 90 ± 2.5 sec. | 3–4 | N/A |

The adhesives of Example 1, Comparative Example 5 and Comparative Example 7 were coated on a facestock (either Mylar or 50 lb. uncoated laser paper) at a given coat weight, as indicated in Table 6 below, to form adhesive constructions. Prior to lamination to the facestock, the viscosity of each polymer was measured on a Brookfield viscometer, using a #4 spindle at 30 rpm, and recorded, and is shown in Table 6 below. The total solids content of each sample was tested according to a gravimetric test method using infrared lamps. Each construction sample was tested for adhesive performance, namely, for shear, peel adhesion and looptack, according to the test methods set forth below. The results of the adhesive performance tests are set forth in Table 6.

Room Temperature Shear

The samples were cut into 12×51 mm (½×2 in.) test strips. The test strips were applied to brightly annealed, highly-polished stainless steel test panels, where the typical size of the test panels was 50×75 mm (2×3 in.), making a sample overlap of 12×12 mm (½×½ in.) with the test panel. The sample portion on the test panel was rolled down using a 2 kg (4.5 lb.), 5.45 pli 65 shore "A" rubber-faced roller, rolling back and forth once, at a rate of 30 cm/min. (12 in./min.). After a dwell time of at least 15 minutes under standard laboratory testing conditions, the test panels with the test strips on them were then placed at an angle 2° from vertical, and a load of 500 g was attached to the end of each test strip. The time in minutes for the sample to fail cohesively (i.e., where the adhesive construction split apart, leaving adhesive residue on the test panel and on the facestock) was measured and recorded. All tests were conducted in triplicate. The results, including failure modes in parentheses, are shown in Table 6 below.

Room Temperature Loop Tack

Loop tack measurements were made for strips that were about 25 mm (1 inch) wide using stainless steel as the substrate at a draw rate of about 305 mm/min (12 in/min), according to standard test 1994 Tag and Label Manufacturers Institute, Inc. (TLMI) Loop Tack Test L-1B2, using an Instron Universal Testor Model 4501 from Instron (Canton, Mass.). Loop tack values were taken to be the highest measured adhesion value observed during the test. The results, reported in lb/in., are set out in Table 6, where the substrate was as indicated and the failure mode is in parentheses.

90° Peel Adhesion

The indicated adhesive constructions were prepared as described above. The substrates used are indicated in Table 6. The resulting construction was die-cut into strips each having an approximate size of 25×204 mm (1×8 in). The strips were centered along the lengthwise direction and applied to 50 152 mm (2×6 in) brightly annealed, highly polished stainless steel test panels that had been washed with diacetone alcohol. The strips were rolled down using a 2 kg (4.5 lb), 5.45 pli 65 shore "A" rubber-faced roller, rolling back and forth once, at a rate of 30 cm/min (12 in/min). The samples were conditioned for 20 minutes in a controlled environment testing room maintained at 21° C. (70° F.) and 50% relative humidity. After conditioning, the test strips were peeled away from the test panel in an Instron Universal Tester according to a modified version of the standard tape method Pressure-Sensitive Tape Council, PSTC-2 (rev. 1995), Peel Adhesion for Single Coated Tapes, where the peel angle was 90°, i.e., perpendicular to the surface of the panel, at a rate of 30 cm/min (12 in/min). A load cell linked to a computer was used to estimate the reported values. The force to remove the adhesive test strip from the test panel was measured in lb/in. All tests were conducted in triplicate. The results, including failure modes in parentheses, are shown in Table 6 below.

TABLE 6

| | Example 1 | Comp. Example 5 | Comp. Example 7 |
|---|---|---|---|
| Coat Weight | 21.9 g/m$^2$ | 20.0 g/m$^2$ | 19.9 g/m$^2$ |
| Facestock | Mylar (2 mil) | Paper | Paper |
| pH | 5.47 | 5.00 | 5.37 |
| Solids | 51.20% | 51.8% | 55.0% |
| Viscosity | 3580 cps | 28,850 cps | 20,150 cps |
| Shear | 61.0 min. | 1.3 min. | 175 min. |
| 90° Peel - S.S. | 0.713 lb/in (ZP) | 3.343 lb/in (95% coh) | 1.816 lb/in (75% PT) |
| 90° Peel - HDPE | 0.175 lb/in (ZP) | 1.827 lb/in (P) | 0.118 lb/in (ZP) |
| 90° Peel - Glass | 0.552 lb/in (ZP) | 3.317 lb/in (95% coh) | 2.088 lb/in (95% PT) |
| 90° Peel - RC | 0.357 lb/in (FP) | 1.404 lb/in (lfp) | 0.844 lb/in (P) |
| Looptack - S.S. | 0.974 lb/in (P) | 3.549 lb/in (P) | 1.481 lb/in (P) |
| Looptack - HDPE | 0.415 lb/in (P) | 2.532 lb/in (P) | 0.069 lb/in (P) |
| Looptack - Glass | 1.003 lb/in (P) | 3.753 lb/in (P) | 1.475 lb/in (P) |
| Looptack - RC | 0.247 lb/in (P) | 1.064 lb/in (P) | 0.533 (LFP) |

Addition of Post-Additives

The effects of various post-additives on the dissolvable PSAs of the present invention were evaluated. Samples of the copolymers of Examples 1 and 2 were blended with one or more additives selected from Ammonium Acetate (AA), Stepan Surfactant 1861-68 (SS), Henkel A-1080 (Henk), and Plasthall P-900 (P-900), as indicated in Table 7 below. These samples were coated a dissolvable acetate facestock and evaluated for dissolvability and ghosting using the methods described above. The results are shown in Table 7.

TABLE 7

| Polymer | Additive 1 | Additive 2 | Additive 3 | Dissolve Time | Ghosting |
|---|---|---|---|---|---|
| Example 1 | — | — | — | 25 seconds | 3 |
| Example 1 | SS (4.0%) | — | — | 15 seconds | 2 |
| Example 1 | SS (4.0%) | P-900 (1.1%) | — | 10 seconds | 1 |
| Example 2 | — | — | — | 27 seconds | 3 |
| Example 2 | AA (6.0%) | SS (3.0%) | P-900 (1.0%) | 14 seconds | 2–3 |
| Example 2 | AA (6.0%) | SS (4.0%) | P-900 (1.0%) | 12 seconds | 2–3 |
| Example 2 | AA (6.0%) | SS (4.0%) | — | 17 seconds | 3 |
| Example 2 | AA (6.0%) | — | — | 24 seconds | 3–4 |
| Example 2 | SS (4.0%) | P-900 (1.0%) | — | 12 seconds | 2 |

TABLE 7-continued

| Polymer | Additive 1 | Additive 2 | Additive 3 | Dissolve Time | Ghost-ing |
|---|---|---|---|---|---|
| Example 2 | SS (4.0%) | P-900 (1.5%) | — | 11 seconds | 1–2 |
| Example 2 | Henk (4.0%) | P-900 (1.0%) | — | 12 seconds | 2 |

Dishwasher Testing

Three adhesive samples, Example 1, Example 1a (Example 1 blended with 4.0% Stepan Surfactant 1861-68) and Example 1b (Example 1 blended with 4.0% Stepan Surfactant 1861-68 and 1.1% Plasthall P-900 plasticizer), were laminated to a dissolvable acetate facestock, and the resulting constructions were tested for their ability to wash cleanly away from a substrate in a dishwasher. Specifically, after the adhesives were laminated to the facestock, the constructions were aged for one week at room temperature (RT), at 90% relative humidity (90% RH), or at 120° F. The constructions were applied to a substrate selected from Lexan, HDPE and glass, and aged for 24 hours, either at room temperature (RT) or in a refrigerator at a temperature of from 38 to 42° F. Thereafter, the substrate with the construction applied thereon was run through a dishwasher at 140° F. for ten minutes with detergent and water. The substrates were observed for label dissolvability and adhesive residue, stain or ghosting.

All of the samples completely dissolved off all of the substrates under all aging conditions. Table 8 describes the extent of adhesive residue, stain or ghosting for each test, where "SL Stain" refers to a slight stain, and "VSL Stain" refers to a very slight stain.

TABLE 8

| Example | Substrate | Substrate Aging | RT | 90% RH | 120° F. |
|---|---|---|---|---|---|
| Example 1 | Glass | RT | Clean | Stain | Clean |
| Example 1a | Glass | RT | SL Stain | VSL Stain | Clean |
| Example 1b | Glass | RT | VSL Stain | SL Stain | VSL Stain |
| Example 1 | Glass | Refrigerator | Clean | SL Stain | Clean |
| Example 1a | Glass | Refrigerator | SL Stain | VSL Stain | VSL Stain |
| Example 1b | Glass | Refrigerator | Clean | SL Stain | Clean |
| Example 1 | HDPE | RT | Stain | Stain | SL Stain |
| Example 1a | HDPE | RT | SL Stain | SL Stain | VSL Stain |
| Example 1b | HDPE | RT | VSL Stain | SL Stain | VSL Stain |
| Example 1 | HDPE | Refrigerator | Stain | Stain | SL Stain |
| Example 1a | HDPE | Refrigerator | SL Stain | VSL Stain | VSL Stain |
| Example 1b | HDPE | Refrigerator | VSL Stain | SL Stain | VSL Stain |
| Example 1 | Lexan | RT | Stain | Stain | Stain |
| Example 1a | Lexan | RT | SL Stain | SL Stain | VSL Stain |
| Example 1b | Lexan | RT | VSL Stain | SL Stain | VSL Stain |
| Example 1 | Lexan | Refrigerator | Stain | Stain | SL Stain |
| Example 1a | Lexan | Refrigerator | SL Stain | SL Stain | VSL Stain |
| Example 1b | Lexan | Refrigerator | VSL Stain | SL Stain | VSL Stain |

The invention has been described and illustrated by exemplary and preferred embodiments, but is not limited thereto. Persons skilled in the art will appreciate that a variety of modifications can be made without departing from the scope of the invention, which is limited only by the claims.

What is claimed is:

1. A dissolvable pressure-sensitive adhesive comprising: an emulsion acrylic copolymer formed from a plurality of monomers comprising:
   (a) at least one alkyl (meth)acrylate
   (b) at least one N-vinyl lactam monomer,
   (c) at least one hydroxy (meth)acrylate ester; and
at least one post-additive blended with the emulsion acrylic copolymer, wherein the at least one post-additive is selected from the group consisting of surfactants, plasticizers and mineral salts.

2. A dissolvable pressure-sensitive adhesive according to claim 1, wherein the copolymer has a weight average molecular weight ranging from about 40,000 to about 100,000.

3. A dissolvable pressure-sensitive adhesive according to claim 1, wherein the at least one N-vinyl lactam monomer is present in the plurality of monomers in a total amount ranging from about 1% to about 15% by weight based on the total weight of the monomers.

4. A dissolvable pressure-sensitive adhesive according to claim 1, wherein the at least one N-vinyl lactam monomer is present in the plurality of monomers in a total amount ranging from about 4% to about 12% by weight based on the total weight of the monomers.

5. A dissolvable pressure-sensitive adhesive according to claim 1, wherein the at least one N-vinyl lactam monomer is present in the plurality of monomers in a total amount ranging from about 6% to about 9% by weight based on the total weight of the monomers.

6. A dissolvable pressure-sensitive adhesive according to claim 1, wherein the at least one hydroxy (meth)acrylate ester is present in the plurality of monomers in a total amount ranging from about 1% to about 15% by weight based on the total weight of the monomers.

7. A dissolvable pressure-sensitive adhesive according to claim 1, wherein the at least one hydroxy (meth)acrylate ester is present in the plurality of monomers in a total amount ranging from about 1% to about 9% by weight based on the total weight of the monomers.

8. A dissolvable pressure-sensitive adhesive according to claim 1, wherein the plurality of monomers further comprises at least one modifying monomer.

9. A dissolvable pressure-sensitive adhesive according to claim 8, wherein the at least one modifying monomer is selected from the group consisting of nitrogen-containing heterocyclic methacrylates and internal crosslinkers.

10. A dissolvable pressure-sensitive adhesive according to claim 8, wherein the at least one modifying monomer is present in the plurality of monomers in a total amount ranging from about 0.02% to about 4% by weight based on the total weight of the monomers.

11. A dissolvable pressure-sensitive adhesive according to claim 8, wherein the at least one modifying monomer is present in the plurality of monomers in a total amount ranging from about 0.05% to about 3% by weight based on the total weight of the monomers.

12. A dissolvable pressure-sensitive adhesive according to claim 8, wherein the at least one modifying monomer is a nitrogen-containing heterocyclic methacrylate.

13. A dissolvable pressure-sensitive adhesive according to claim 8, wherein the at least one modifying monomer is 1-2-methacryloxyethyl)imidazolidin-2-one.

14. A dissolvable pressure-sensitive adhesive according to claim 8, wherein the adhesive, when coated on a dissolvable acetate facestock and subjected to a dissolvability test, dissolves in less than about 40 seconds.

15. A dissolvable pressure-sensitive adhesive according to claim 8, wherein the adhesive, when coated on a dissolvable acetate facestock and subjected to a dissolvability test, dissolves in less than about 33 seconds.

16. A dissolvable pressure-sensitive adhesive according to claim 1, wherein the at least one post-additive is a surfactant.

17. A dissolvable pressure-sensitive adhesive according to claim 16, wherein the at least one post-additive surfactant is blended in an amount ranging from about 0.4% to about 10% by weight, based on the total weight of the copolymer.

18. A dissolvable pressure-sensitive adhesive according to claim 16, wherein the at least one post-additive surfactant is blended in an amount ranging from about 2% to about 6% by weight, based on the total weight of the copolymer.

19. A dissolvable pressure-sensitive adhesive according to claim 1, wherein the at least one post-additive is a polymeric plasticizer.

20. A dissolvable pressure-sensitive adhesive according to claim 19, wherein the at least one post-additive polymeric plasticizer is blended in an amount ranging from about 0.1% to about 3% by weight, based on the total weight of the copolymer.

21. A dissolvable pressure-sensitive adhesive according to claim 19, wherein the at least one post-additive polymeric plasticizer is blended in an amount ranging from about 0.5% to about 1.5% by weight, based on the total weight of the copolymer.

22. A dissolvable pressure-sensitive adhesive according to claim 1, wherein the plurality of monomers further comprises at least one surfactant.

23. A dissolvable pressure-sensitive adhesive according to claim 22, wherein the at least one surfactant is a sodium nonylphenol ethoxylate sulfate surfactant.

24. A dissolvable pressure-sensitive adhesive according to claim 23, wherein the at least one sodium nonylphenol ethoxylate sulfate surfactant is present in the plurality of monomers in a total amount ranging from about 4% to about 12% by weight based on the total weight of the monomers.

25. A dissolvable pressure-sensitive adhesive according to claim 1, wherein the adhesive, when coated on a dissolvable acetate facestock and subjected to a dissolvability test, dissolves in less than about 40 seconds.

26. A dissolvable pressure-sensitive adhesive according to claim 1, wherein the adhesive, when coated on a dissolvable acetate facestock and subjected to a dissolvability test, dissolves in less than about 33 seconds.

27. A dissolvable pressure-sensitive adhesive comprising an emulsion acrylic copolymer formed from a plurality of monomers comprising:
    (a) at least one N-vinyl lactam monomer present in an amount ranging from about 1% to about 15% by weight, based on the total weight of the monomers;
    (b) at least one hydroxy (meth)acrylate ester present in an amount ranging from about 1% to about 15% by weight, based on the total weight of the monomers;
    (c) at least one alkyl (meth)acrylate present in an amount ranging from about 35% to about 80% by weight, based on the total weight of the monomers; and
    (d) at least one ethylenically unsaturated carboxylic acid monomer present in an amount ranging from about 4% to about 15% by weight, based on the total weight of the monomers.

28. A dissolvable pressure-sensitive adhesive according to claim 27, further comprising at least one modifying monomer present in an amount ranging from about 0.02% to about 4% by weight, based on the total weight of the monomers.

29. A dissolvable pressure-sensitive adhesive according to claim 28, wherein the at least one modifying monomer is selected from the group consisting of nitrogen-containing heterocyclic methacrylates and internal crosslinkers.

30. A dissolvable pressure-sensitive adhesive according to claim 27, further comprising at least one vinyl ester present in an amount ranging from about 8% to about 18% by weight, based on the total weight of the monomers.

31. A dissolvable pressure-sensitive adhesive according to claim 27, wherein the plurality of monomers further comprises at least one surfactant.

32. A dissolvable pressure-sensitive adhesive according to claim 31, wherein the at least one surfactant is a sodium nonylphenol ethoxylate sulfate surfactant.

33. A dissolvable pressure-sensitive adhesive according to claim 27, further comprising at least one sodium nonylphenol ethoxylate sulfate surfactant present in an amount ranging from about 4% to about 12% by weight, based on the total weight of the monomers.

34. A dissolvable pressure-sensitive adhesive according to claim 27, wherein the plurality of monomers comprises:
    (a) at least one N-vinyl lactam monomer present in an amount ranging from about 4% to about 12% by weight, based on the total weight of the monomers;
    (b) at least one hydroxy (meth)acrylate ester present in an amount ranging from about 1% to about 9% by weight, based on the total weight of the monomers;
    (c) at least one alkyl (meth)acrylate present in an amount ranging from about 50% to about 70% by weight, based on the total weight of the monomers;
    (d) at least one ethylenically unsaturated carboxylic acid monomer present in an amount ranging from about 6% to about 12% by weight, based on the total weight of the monomers;
    (e) at least one modifying monomer present in an amount ranging from about 0.05% to about 3% by weight, based on the total weight of the monomers; and
    (f) at least one vinyl ester present in an amount ranging from about 11% to about 15% by weight, based on the total weight of the monomers.

35. A dissolvable pressure-sensitive adhesive according to claim 34, wherein the at least one modifying monomer is selected from the group consisting of nitrogen-containing heterocyclic methacrylates and internal crosslinkers.

36. A dissolvable pressure-sensitive adhesive according to claim 34, wherein the plurality of monomers further comprises at least one sodium nonylphenol ethoxylate sulfate surfactant present in an amount ranging from about 4% to about 12% by weight, based on the total weight of the monomers.

37. A dissolvable pressure-sensitive adhesive according to claim 34, wherein the adhesive, when coated on a dissolvable acetate facestock and subjected to a dissolvability test, dissolves in less than about 40 seconds.

38. A dissolvable pressure-sensitive adhesive according to claim 34, wherein the adhesive, when coated on a dissolvable acetate facestock and subjected to a dissolvability test, dissolves in less than about 33 seconds.

39. A dissolvable pressure-sensitive adhesive according to claim 27, wherein the adhesive, when coated on a dissolvable acetate facestock and subjected to a dissolvability test, dissolves in less than about 40 seconds.

40. A dissolvable pressure-sensitive adhesive according to claim 27, wherein the adhesive, when coated on a dissolvable acetate facestock and subjected to a dissolvability test, dissolves in less than about 33 seconds.

41. A dissolvable pressure-sensitive adhesive label comprising a dissolvable facestock and an emulsion acrylic copolymer laminated to the facestock, wherein the emulsion acrylic copolymer is formed from a plurality of monomers comprising:

(a) at least one alkyl (meth)acrylate;
(b) at least one N-vinyl lactam monomer;
(c) at least one hydroxy (meth)acrylate ester; and
at least one post-additive blended with the emulsion acrylic copolymer, wherein the at least one post-additive is selected from the group consisting of surfactants, plasticizers and mineral salts.

42. A dissolvable pressure-sensitive adhesive label according to claim 41, wherein the plurality of monomers further comprises at least one modifying monomer.

43. A dissolvable pressure-sensitive adhesive label according to claim 42, wherein the at least one modifying monomer is selected from the group consisting of nitrogen-containing heterocyclic methacrylates and internal crosslinkers.

44. A dissolvable pressure-sensitive adhesive label according to claim 41, wherein the plurality of monomers further comprises at least one surfactant.

45. A dissolvable pressure-sensitive adhesive label according to claim 44, wherein at least one surfactant is a sodium nonylphenol ethoxylate sulfate surfactant.

* * * * *